US008510789B2

(12) United States Patent
Goh et al.

(10) Patent No.: US 8,510,789 B2
(45) Date of Patent: Aug. 13, 2013

(54) DATA OUTPUT METHOD, SYSTEM AND APPARATUS

(75) Inventors: Cheh Goh, Singapore (SG); Liqun Chen, Bristol (GB); Stephen James Crane, Bristol (GB); Marco Casassa Mont, Bristol (GB); Keith Alexander Harrison, Monmouthshire (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2527 days.

(21) Appl. No.: 10/664,069

(22) Filed: Sep. 16, 2003

(65) Prior Publication Data
US 2005/0102512 A1    May 12, 2005

(30) Foreign Application Priority Data

Sep. 17, 2002 (GB) .................................. 0221639.8

(51) Int. Cl.
G06F 17/00 (2006.01)
(52) U.S. Cl.
USPC ............................................................ 726/1
(58) Field of Classification Search
USPC ................. 711/100, 104, 111, 112, 115, 163, 711/164; 710/1, 12, 36, 65; 726/4–6, 17, 726/21, 26–28, 30, 1, 2; 713/153, 161, 170, 713/171, 189, 165, 167, 168, 159, 193; 380/228, 232, 277
See application file for complete search history.

(56) References Cited

U.S. PATENT DOCUMENTS

| | | | | |
|---|---|---|---|---|
| 6,119,108 A | | 9/2000 | Holmes et al. | 705/40 |
| 6,314,409 B2* | | 11/2001 | Schneck et al. | 705/54 |
| 6,609,114 B1* | | 8/2003 | Gressel et al. | 705/50 |
| 6,879,965 B2* | | 4/2005 | Fung et al. | 705/39 |
| 6,983,371 B1* | | 1/2006 | Hurtado et al. | 713/189 |
| 7,089,420 B1* | | 8/2006 | Durst et al. | 713/176 |
| 2001/0037462 A1 | | 11/2001 | Bengtson | 713/201 |
| 2002/0013772 A1* | | 1/2002 | Peinado | 705/51 |
| 2003/0196099 A1* | | 10/2003 | Lampson et al. | 713/189 |

FOREIGN PATENT DOCUMENTS

| | | |
|---|---|---|
| EP | 0 665 486 A2 | 8/1995 |
| EP | 0 935 182 A1 | 8/1999 |
| EP | 1 146 684 A2 | 10/2001 |
| GB | 2 336 512 A | 11/1999 |

OTHER PUBLICATIONS

D. Boneh and M. Franklin, "Identity-Based Encryption from the Wiel Pairing," *Advances in Cryptology—CRYPTO 2001*, LNCS 2139, pp. 213-229, Springer-Verlag, 2001.
D. Boneh, et al., "Identity-Based Mediated RSA," *3rd Workshop on Information Security Application*, Jeju Island, Korea, Aug. 2002.
C. Cocks, "An Identity Based Encryption Scheme Based on Quadratic Residues," *Proceedings of the 8th IMA International Conference on Cryptography and Coding*, LNCS 2260, pp. 360-363, Springer-Verlag, 2001.

* cited by examiner

*Primary Examiner* — Beemnet Dada

(57) ABSTRACT

Data to be output to a removable storage medium is encrypted for sending to an output device by an encryption process based on encryption parameters comprising public data of a trusted party and an encryption key string comprising a policy for allowing the output of the data. The trusted party provides a decryption key to the output device but only after being satisfied that the policy has been met. The decryption key is generated in dependence on the encryption key string and private data of the trusted party. The output device uses the decryption key in decrypting the data to be output. Embodiments are provided that involve multiple policies and trusted parties.

38 Claims, 4 Drawing Sheets

DATA OUTPUT METHOD, SYSTEM AND APPARATUS

FIELD OF THE INVENTION

The present invention relates to a method, system and apparatus for outputting data to a removable storage medium and, in particular, but not exclusively to data output by printing.

BACKGROUND OF THE INVENTION

A number of different techniques have been developed to minimise unauthorised access to data held on a computer apparatus or to data transmitted between computer apparatuses.

However, should a user print confidential information to a remote printer this can result in the confidential information being accessible to anyone who has access to the printer, which for mobile users can be particularly undesirable.

One solution to this problem has been to use a printer spooler, within a printer server, which will only deliver a job to a printer, for printing, if the recipients of the job authenticate themselves to the printer spooler. However, this requires specific configuration of a printer spooler, which as a result can limit the conditions under which a document can be printed.

It is desirable to improve this situation.

Embodiments of the present invention to be described hereinafter make use of a cryptographic technology known as identifier-based encryption. Accordingly, a brief description will now be given of this type of encryption.

Identifier-Based Encryption (IBE) is an emerging cryptographic schema. In this schema (see FIG. 1 of the accompanying drawings), a data provider 10 encrypts payload data 13 using both an encryption key string 14, and public data 15 provided by a trusted authority 12. This public data 15 is derived by the trusted authority 12 using private data 17 and a one-way function 18. The data provider 10 then provides the encrypted payload data <13> to a recipient 11 who decrypts it, or has it decrypted, using a decryption key computed by the trusted authority 12 in dependence on the encryption key string and its own private data.

A feature of identifier-based encryption is that because the decryption key is generated from the encryption key string, its generation can be postponed until needed for decryption.

Another feature of identifier-based encryption is that the encryption key string is cryptographically unconstrained and can be any kind of string, that is, any ordered series of bits whether derived from a character string, a serialized image bit map, a digitized sound signal, or any other data source. The string may be made up of more than one component and may be formed by data already subject to upstream processing. In order to avoid cryptographic attacks based on judicious selection of a key string to reveal information about the encryption process, as part of the encryption process the encryption key string is passed through a one-way function (typically some sort of hash function) thereby making it impossible to choose a cryptographically-prejudicial encryption key string. In applications where defence against such attacks is not important, it would be possible to omit this processing of the string.

Frequently, the encryption key string serves to "identify" the intended message recipient and the trusted authority is arranged to provide the decryption key only to this identified intended recipient. This has given rise to the use of the label "identifier-based" or "identity-based" generally for cryptographic methods of the type under discussion. However, depending on the application to which such a cryptographic method is put, the string may serve a different purpose to that of identifying the intended recipient. Accordingly, the use of the term "identifier-based" or "IBE" herein in relation to cryptographic methods and systems is to be understood simply as implying that the methods and systems are based on the use of a cryptographically unconstrained string whether or not the string serves to identify the intended recipient. Generally, in the present specification, the term "encryption key string" or "EKS" is used rather than "identity string" or "identifier string"; the term "encryption key string" is also used in the shortened form "encryption key" for reasons of brevity.

A number of IBE algorithms are known and FIG. 2 indicates, for three such algorithms, the following features, namely:

the form of the encryption parameters 5 used, that is, the encryption key string and the public data of the trusted authority (TA);

the conversion process 6 applied to the encryption key string to prevent attacks based on judicious selection of this string;

the primary encryption computation 7 effected;

the form of the encrypted output 8.

The three prior art IBE algorithms to which FIG. 2 relates are:

Quadratic Residuosity (QR) method as described in the paper: C. Cocks, "An identity based encryption scheme based on quadratic residues", Proceedings of the $8^{th}$ IMA International Conference on Cryptography and Coding, LNCS 2260, pp 360-363, Springer-Verlag, 2001. A brief description of this form of IBE is given hereinafter.

Bilinear Mappings p using, for example, a Tate pairing t or modified Weil pairing ê. Thus, for the modified Weil pairing:

$$ê: G_1 \times G_1 \rightarrow G_2$$

where $G_1$ and $G_2$ denote two algebraic groups of prime order q and $G_2$ is a subgroup of a multiplicative group of a finite field. The Tate pairing (to which the example given in FIG. 2 specifically relates) can be similarly expressed though it is possible for it to be of asymmetric form:

$$t: G_1 \times G_0 \rightarrow G_2$$

where $G_0$ is a further algebraic group the elements of which are not restricted to being of order q. Generally, the elements of the groups $G_0$ and $G_1$ are points on an elliptic curve though this is not necessarily the case. A description of this form of IBE method, using modified Weil pairings is given in the paper: D. Boneh, M. Franklin—"Identity-based Encryption from the Weil Pairing" in *Advances in Cryptology—CRYPTO* 2001, LNCS 2139, pp. 213-229, Springer-Verlag, 2001.

RSA-Based methods The RSA public key cryptographic method is well known and in its basic form is a two-party method in which a first party generates a public/private key pair and a second party uses the first party's public key to encrypt messages for sending to the first party, the latter then using its private key to decrypt the messages. A variant of the basic RSA method, known as "mediated RSA", requires the involvement of a security mediator in order for a message recipient to be able to decrypt an encrypted message. An IBE method based on mediated RSA is described in the paper "Identity based encryption using mediated RSA", D. Boneh, X. Ding and G.

SUMMARY OF THE INVENTION

In accordance with a first aspect of the present invention there is provided a system comprising:
  an output device for outputting data onto a removable storage medium;
  a first computing entity arranged to encrypt a first data set based on encryption parameters comprising public data of a trusted party and an encryption key string comprising a second data set that defines a policy for allowing the output of the first data set onto a said removable storage medium, the first computing entity being further arranged to output the encrypted first data set for the output device; and
  a second computing entity associated with the trusted party and arranged when satisfied that said policy has been met, to output for the output device a decryption key for use in decrypting the encrypted first data set, the second computing entity being arranged to generate this decryption key in dependence on the encryption key string and private data related to said public data;
  the output device being arranged to use the decryption key in decrypting the encrypted first data set.

The output device is, for example, a printer.

In accordance with a second aspect of the present invention there is provided a data output method comprising the steps of:
  (a) encrypting a first data set based on encryption parameters comprising public data of a trusted party and an encryption key string comprising a second data set that defines a policy for allowing the output of the first data set to a removable storage medium,
  (b) providing the encrypted first data set to an output deviceadapted to output data to a removable storage medium;
  (c) at the trusted party checking that said policy has been satisfied and thereafter providing the output device with a decryption key for use in decrypting the encrypted first data set, this decryption key being generated in dependence on the encryption key string and private data related to said public data; and
  (d) at the output device using the decryption key in decrypting the encrypted first data set and outputting the first data set to a removable recording medium.

In accordance with a third aspect of the present invention there is provided printing apparatus including:
  means for receiving both an encryption key string comprising policy data defining a policy for allowing the printing of payload data, and said payload encrypted based on encryption parameters comprising public data of a trusted party and said encryption key string;
  means for providing the encryption key string to the trusted authority and for receiving back a decryption key; and
  means for using the received decryption key in decrypting the encrypted payload data for printing.

BRIEF DESCRIPTION OF THE DRAWINGS

For a better understanding of the present invention and to understand how the same may be brought into effect reference will now be made, by way of example only, to the accompanying drawings, in which.

BEST MODE FOR CARRYING OUT THE INVENTION

The embodiments described below all generally provide a printing system that is arranged, using identifier based encryption, to ensure that where a job is sent to a printer, it can only be printed in cleartext if a policy associated with the job has been satisfied, this policy specifying one or more conditions, such as verification constraints to be satisfied and notifications to be made. More particularly, the job is encrypted for sending to the printer using an IBE encryption key string that is based on the policy; to decrypt the job, the printer must obtain the corresponding IBE decryption key from a trusted authority that is responsible for checking that the policy has been satisfied. As will be described below, it is possible to involve more than one trusted authority in this process, each responsible for checking that one or more conditions have been met; in this case, the policy can be divided into sub-policies with each trusted authority only checking the relevant sub-policy, or multiple separate policies can be provided, one for each trusted authority.

Figure 1:
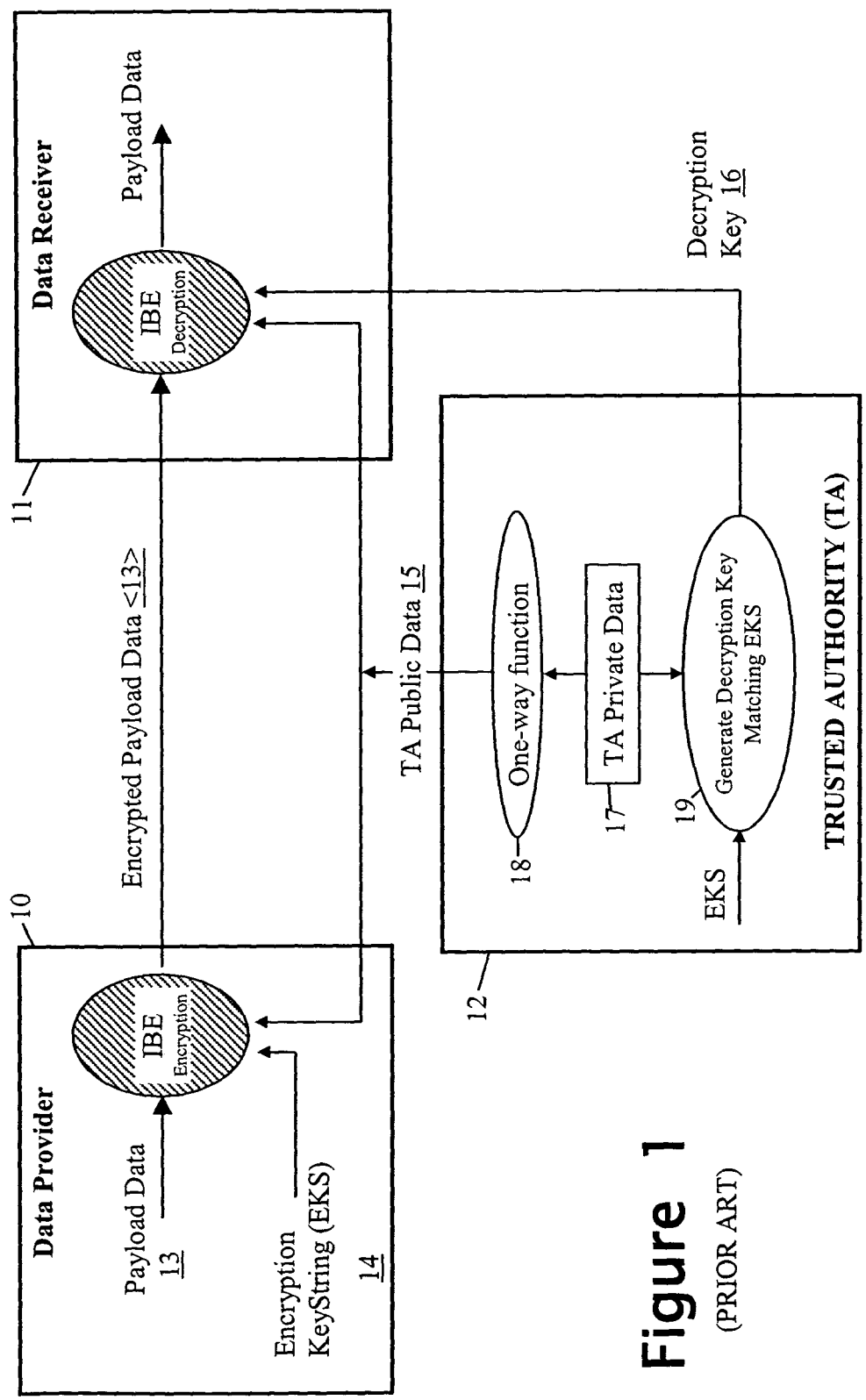
FIG. 1 is a diagram illustrating the operation of a prior art encryption schema known as Identifier-Based Encryption (IBE)
Figure 2:
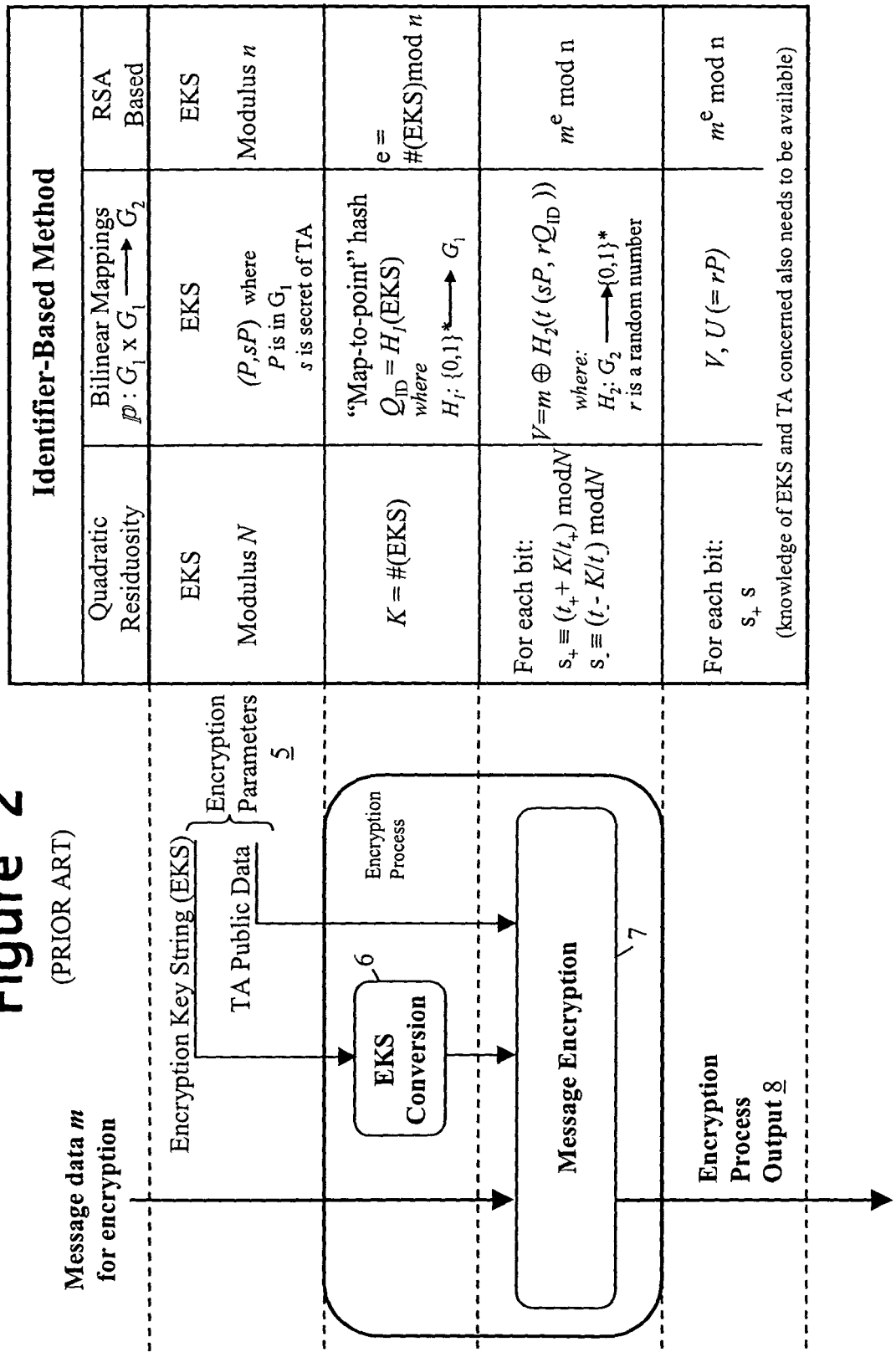
FIG. 2 is a diagram illustrating how certain IBE operations are implemented by three different prior art IBE methods.
Figure 3:
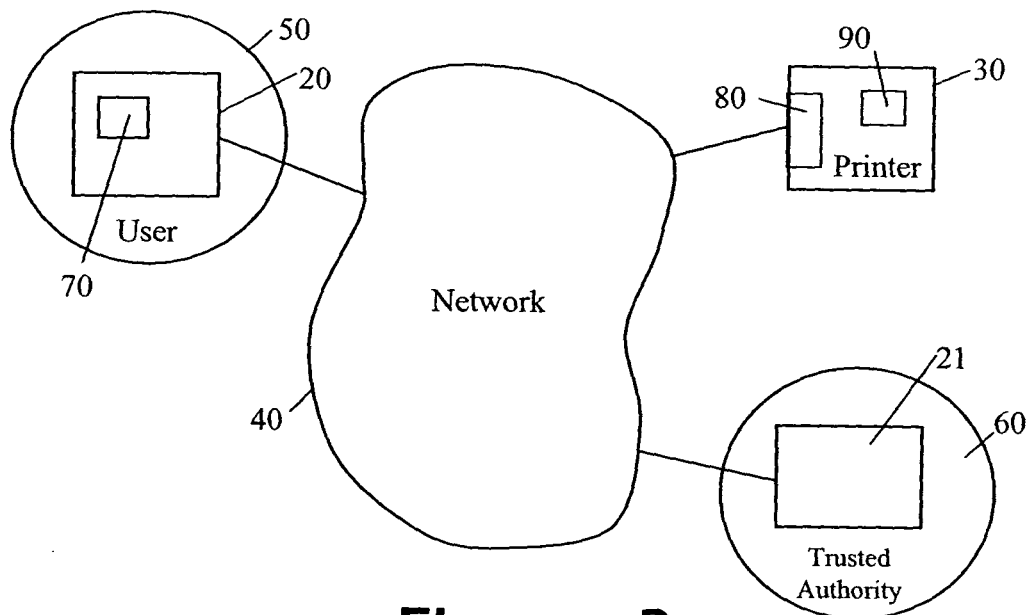
FIG. 3 is a diagram illustrating a system according to a first embodiment of the present invention.

First Embodiment The first embodiment is shown in FIG. 3 and comprises a first computing entity 20, a second computing entity 21 and a printer 30, all connected via a network 40, for example the Internet.

The first computing entity 20 represents a user 50 and the second computing entity 21 represents a trusted authority 60.

The first and second computing entities 20, 21 are, for example, based on conventional program-controlled processors (possibly with specific hardware for implementing cryptographic processes) as are well known to a person skilled in the art. As used herein, the term "computing entity" refers to a distinct functional element but this is not to be taken as excluding the possibility of the same computer apparatus serving as the basis of two or more computing entities with the specific functionality of each such entity being provided by corresponding program processes running on the apparatus.

The first computing entity 20 includes a processor 70 that is arranged to allow the generation of a printing policy that stipulates the requirements for allowing the printing of a document, for example a policy could stipulate that a document may only be printed at a specific printer. The policy can be expressed in any suitable form, for example XML format.

Additionally or alternatively, however, the first computing entity 20 could receive the printing policy from an external source, for example, from the trusted authority 60, via the network 40.

Once the policy has been generated, or received, by the first computing entity 20 the processor 70 is arranged to use the policy, or a representation of the policy, as an encryption key string in an IBE (Identifier-Based Encryption) process for encrypting the document to be printed.

Once the document has been encrypted, it is forwarded via the network 40 to the printer 30. Typically, if the policy has been generated by the user 50, the policy is also forwarded to the printer 30 with the encrypted document.

The printer 30 includes an interface 80 for coupling the printer 30 to the network 40 and a processor 90.

Associated with the printer 30 is local printer information that includes device identity, serial number, location, etc.

On receipt of the encrypted document by the printer 30, the processor 90 is arranged, via the interface 80 and network 40, to contact the trusted authority 60 to request an associated decryption key to allow the printer 30 to decrypt the received encrypted document. Additionally, the processor 90 is arranged to forward the related printing policy to the trusted authority 60 (assuming this policy has been provided to the printer by the user 50).

On receipt by the trusted authority 60 of a request from the printer 30 for a decryption key, the trusted authority 60 determines if the trusted authority 60 has the associated policy used to derive the encryption key. The trusted authority 60 will typically receive the policy via the printer 30, as described above, however other mechanisms could be established, for example the user 50 could provide the policy to the trusted authority 60 directly. Alternatively, the trusted authority 60 could generate the relevant policy and provide it to the user 50 to allow the user 50 to encrypt the document, as described below.

On receipt of the request for a decryption key with the relevant policy, the trusted authority 60 determines whether the appropriate policy has been complied with. If the trusted authority 60 believes that the policy has been complied with, the trusted authority 60 generates an associated IBE decryption key using data corresponding to the encryption key string and forwards the decryption key to the printer 30 to enable the latter to decrypt the document. Of course, the trusted authority can generate the decryption key in parallel with, or even before, carrying out its determination as to whether the appropriate policy has been met provided that it defers providing the decryption key to the printer until satisfied that the policy has been met.

A more detailed description will now be given of the IBE encryption/decryption processes employed by the first embodiment, these processes being based, by way of example, on the use of bilinear maps It is to be understood, however, that other IBE processes can alternatively be used such as those based on on quadratic residue techniques, or on RSA techniques.

In the following, $G_1$ and $G_2$ denote two groups of prime order q in which the discrete logarithm problem is believed to be hard and for which there exists a computable bilinear map jp expressed as:

$$p: G_1 \times G_1 \to G_2$$

$G_1$ is here assumed to be a group of points on an elliptic curve (though this is not necessarily the case) and $G_2$ is a subgroup of a multiplicative group of a finite field $F_q$. Example computable bilinear maps are the Tate pairing and the Weil pairing (though, as is well known to persons skilled in the art, for cryptographic purposes, a modified form of the Weil pairing is used that ensure e (P,P)≠1 where $P \in G_1$).

As the mapping between $G_1$ and $G_2$ is bilinear exponents/multipliers can be moved around. For example if a, b, c $\in F_q$ and P, Q $\in G_1$ then $$p(aP, bQ)^c = p(aP, cQ)^b$$
$$= p(bP, cQ)^a$$

-continued
$$= p(bP, aQ)^c$$
$$= p(cP, aQ)^b$$
$$= p(cP, bQ)^a$$
$$= p(abP, Q)^c$$
$$= p(abP, cQ)$$
$$= p(P, abQ)^c$$
$$= p(cP, abQ)$$
$$= \ldots$$
$$= p(abcP, Q)$$
$$= p(P, abcQ)$$
$$= p(P, Q)^{abc}$$

To set up the system: a large (at least 512-bits) prime p is chosen such that p=2 mod 3 and p=6q−1 for some prime q>3; an elliptic curve, E, such as $y^2 = x^3 + 1$ over $F_p$ is defined; and an arbitrary point, P, on E, i.e., $P \in E/F_p$ of order q is chosen.

Additionally, the following cryptographic hash functions are defined:
$H_1: \{0,1\}^* \to F_p$;
$H_2: F_{p^2} \to \{0,1\}^k$ for some security parameter k;
$H_3: \{0,1\}^k \times \{0,1\}^k \to Z^*_q$,
$H_4: \{0,1\}^k \to \{0,1\}^k$.

A public/private key pair is defined for the trusted authority 60 where the public key R is: $R \in G1$ and the private key s is: $s \in F_q$ with $R = sP \in G_1$.

Additionally, this embodiment uses an identifier based public key $Q_{ID}$/private key $S_{ID}$ pair where the $Q_{ID}$, $S_{ID} \in G_1$ and the trusted authority's public/private key pair (R,s) is linked with the identifier based public/private key by
$S_{ID} = sQ_{ID}$ and $Q_{ID} = $MapToPoint ($H_1$ (ID))
where ID is an identifier string (encryption key string).

Given the hash function $H_1: \{0,1\}^* \to F_p$, algorithm MapToPoint works as follows on input $H_1(ID) = y_0 \in F_p$:
(1) Compute $x_0 = (y_0^2 - 1)^{1/3} = (y_0^2 - 1)^{(2p-1)/3} \in F_p$.
(2) Let $Q = (x_0, y_0) \in E/F_p$ and set $Q_{ID} = 6Q \in G_1$.
(3) Output MapToPoint($y_0$)=$Q_{ID}$.

Identifier based encryption allows the holder of the private key $S_{ID}$ of an identifier (encryption key string) based key pair to decrypt a document sent to them encrypted using the associated public key $Q_{ID}$. In the present case, the printing policy is used as the encryption key string to derive the public key $Q_{ID}$, hereinafter referred to as $Q_{print}$. Once this public key has been derived, the document m to be printed can be encrypted by performing the following computation.

Selects a random number $\sigma \in \{0,1\}^k$.
Computes $r = H_3(\sigma, m)$, where r is a random element that ensures only someone with the appropriate private key can decrypt the document, m.
Computes U=rP.
Computes $g_{print} = \hat{e}(Q_{print}, R) \in F_{p^2}$.
Computes $V = \sigma \oplus H_2(g_{print})$.
Computes $W = m \oplus H_4(\sigma)$.
Sets the ciphertext to be C=(U, V, W).

As stated above the ciphertext, which corresponds to the encrypted document, m, is forwarded to the printer 30.

The printer 30 contacts the trusted authority 60 to obtain the associated private key related to the public key $Q_{print}$. On being contacted, the trusted authority 60 checks that the printing policy on which $Q_{print}$ is based is satisfied and, if so, provides the user 50 with the appropriate private key. The appropriate private key, here called $S_{print}$, is a combination of $Q_{print}$ and the trusted authority's private key s, that is:

$$S_{print} = sQ_{print}$$

On receipt of the private key $S_{print}$ the document is decrypted by the printer performing the following computation:

Tests $U \in E/F_p$ of order q;
Computes $x = p(S_{print}, U)$;
Computes $\sigma = V \oplus H_2(x)$;
Computes $m = W \oplus H_4(\sigma)$;
Computes $r = H_3(\sigma, m)$;
Checks $U = rP$.

It may be noted that in the above-noted variant where the trusted authority 60 generates the relevant policy, if the user does not need to see the policy, then the trusted authority could simply provide the user 50 with $Q_{print}$ rather than with the underlying printing policy (encryption key string); in either case, the encryption of the documents is still based on the encryption key string and the public key of the trusted authority. Conversely, where the user 50 has generated the policy, the user can provide not only the policy but also $Q_{print}$ to the trusted authority to save the latter having to recalculate this value; in either case, generation of the decryption key $S_{print}$ is effected in dependence on the encryption key string and the private key of the trusted authority. In both the foregoing situations where a party (user/trusted authority) receives $Q_{print}$ rather than the encryption key string (printing policy), that party has to trust that the link between the policy and $Q_{print}$ has not been broken which would generally involve authentication and integrity checking with respect to the transfer of $Q_{print}$.

In another variant of the first embodiment the second computing entity 21 that serves as the trusted authority 60 is incorporated into a portable device 60, such as a smartcard, that can only communicate with the printer 30 when the portable device is present at the printer. More specifically, the portable device is provided with a first communications interface and the printer has a complementary second communications interface, these interfaces being such that communication between the trusted authority and printer can only take place when the interfaces are close to each other (for example, the interfaces can be designed to require physical interconnection or to provide for a short range (<10 meters) wireless connection). In this variant the portable device would typically be carried by a person having authority to print the data of interest so that the person would need to be present at the printer before the decryption key can be provided by the trusted authority to the printer. In this case, the printing policy need not require any specific condition to be checked though, preferably, the policy at least requires that the trusted authority authenticates his/herself in some way as being the authorized possessor of the portable device (such as by input of a PIN code). In one application of this variant, the authorized possessor of the portable device can request a document to be sent by the first computing entity 20 (which may be the possessor's home computing system, for example) in encrypted form to a printer 30 near the possessor who can be anywhere in the world; in this case, only the possessor of the portable device can enable decryption of the document by the printer.

Figure 4:
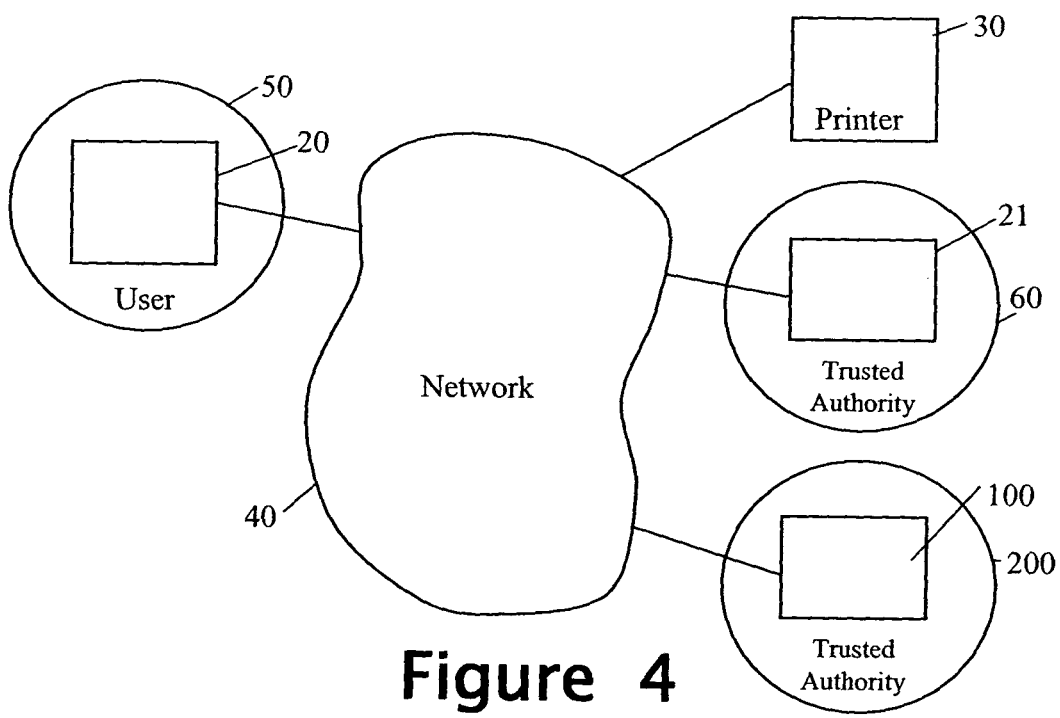
FIG. 4 is a diagram illustrating a system according to a second embodiment of the present invention.

Second Embodiment The above embodiment can be expanded to include multiple trusted authorities where the decryption requires a decryption key from each of the individual trusted authorities. One embodiment of multiple trusted authorities is shown in FIG. 4, which is based upon the system shown in FIG. 3 with the addition of a third computing entity 100, where the third computing entity 100 acts as a second trusted authority 200, independent of the first trusted authority 60.

As with the first trusted authority 60, the second trusted authority 200 has a unique public/private key pair.

As described below, there is an independent printing policy associated with each trusted authority 60, 200, and a corresponding IBE public key $Q_{print1}$ and $Q_{print2}$ is formed from each policy. Each trusted authority 60, 200 generates a private key $S_{print1}$, $S_{print2}$ corresponding to the respective public key, as described above. To send an encrypted document to the printer 30 the user 50 encrypts the document with a combination of the printing-policy public keys $Q_{print1}$, $Q_{print2}$ associated with the trusted authorities 60, 200 respectively, and the respective public keys $R_1$, $R_2$ of these authorities. On receipt of the encrypted document the printer 30 decrypts the document with a combination of the private keys $S_{print1}$, $S_{print2}$ associated with the respective policies; the printer 30 obtains the private keys $S_{print1}$, $S_{print2}$ from the trusted authorities 60, 200 respectively with each trusted authority only releasing the related private key when satisfied that the associated printing policy has been satisfied.

The second embodiment will now be described in more.

The first trusted authority 60 has a public key $R_1$ and a corresponding private key $s_1$ where $R_1 = s_1 P$, with P being a point on an elliptic curve, as described above.

The second trusted authority 200 has a public key $R_2$ and a corresponding private key $s_2$ where $R_2 = s_2 P$, with P being the same point on the elliptic curve as used by the first trusted authority.

The user 50 defines a first and a second printing policy that are associated with the first and second trusted authorities 60, 200 respectively, that is to say with the first trusted authority 60 the user 50 has a first policy Print1, whilst with the second trusted authority 200 the user 50 had a second policy Print2.

Using the first policy Print1 as an IBE encryption key string, a first public key $Q_{print1}$ is derived:

$$Q_{print1} = \text{MapToPoint} H_1(\text{Print1})$$

The trusted authority 60 can use this public key to generate a corresponding IBE decryption key:

$$S_{print1} = s_1 Q_{print1}$$

Similarly, using the second policy Print2 as an IBE encryption key string, a second public key $Q_{print2}$ is derived:

$$Q_{print2} = \text{MapToPoint} H_1(\text{Print2})$$

The trusted authority 200 can use this public key to generate a corresponding IBE decryption key:

$$S_{print2} = s_2 Q_{print2}$$

Using $Q_{print1}$ and $Q_{print2}$, the user 50 encrypts a document m for sending to the printer 30 by generating ciphertext U, V and W in steps in which it:

Selects a random number $\sigma \in \{0,1\}^k$.
Computes $r = H_3(\sigma, m)$.
Computes $U = rP$.
Computes $g_{print} = \Pi_{(1 \leq i \leq 2)} p(Q_{print}, R_i) \in F_{p^2}$.
Computes $V = \sigma \oplus H_2(g_{print})$.
Computes $W = m \oplus H_4(\sigma)$.
Sets the ciphertext to be $C = (U, V, W)$.

Decryption is performed by the printer by computing:
Tests $U \in E/F_p$ of order q;
Computes $x = p(\Sigma_{(1 \leq i \leq 2)} S_{print1}, U)$;
Computes $\sigma = V \oplus H_2(x)$;
Computes $m = W \oplus H_4(\sigma)$;
Computes $r = H_3(\sigma, m)$;
Checks $U = rP$.

where the private (decryption) keys $S_{print1}$ and $S_{print2}$ are provided to the printer 30 on satisfactory compliance of the respective policy Print1, Print2. As will be appreciated, the message m can only be decrypted with knowledge of both private keys $S_{print1}$ and $S_{print2}$.

Figure 5:
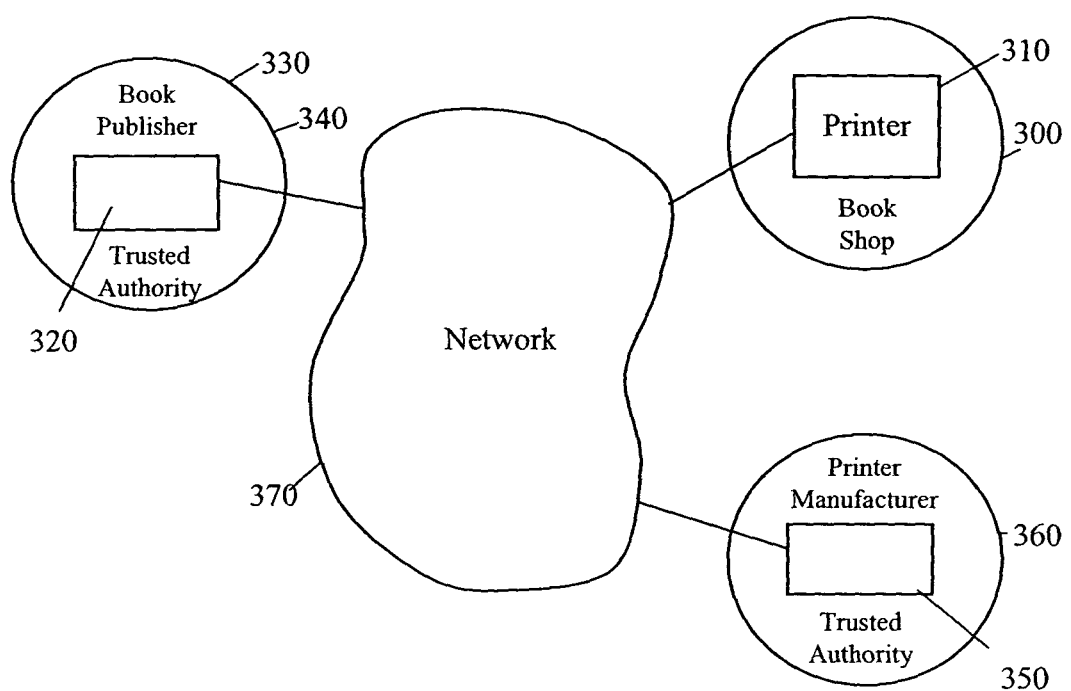
FIG. 5 is a diagram illustrating a system according to a third embodiment of the present invention.

FIG. 5 depicts a specific example of the use of two trusted authorities, one of which is associated with a computing entity provided by computer apparatus that also acts as the computing entity for the encrypting party (the user 50 of FIG. 4). More particularly, FIG. 5 shows a bookshop 300 that includes a printer 310; first and second computing entities 320, 321 provided on the same computing platform and respectively acting as an encrypting entity for a book publisher 330 and as a first trusted authority 340 associated with the book publisher; and a third computing entity 350 associated with the printer manufacture and also acting as a second trusted authority 360. The printer 310, the first and second computing entities 320, 321, and the second computing entity 350 are connected via a network 370, for example the Internet.

The bookshop 300 allows customers to locally print books using the printer 310. For each book, the book publisher 330 has used the computing entity 320 to provide the bookshop 300 with an encrypted version of the book encrypted using a public key derived using respective policies for the two trusted authorities 340, 360, as described above.

The first policy, intended for the first trusted authority 340 (i.e. the book publishers themselves), contains references to the book and the bookshop. The second policy requires that the second trusted authority 360 (i.e. the printer manufacture) confirm the integrity and operability of the printer 310 before issuing an appropriate private key.

When a customer attempts to print a book the printer detects the two associated policies and sends each policy to the relevant trusted authority 340, 360 to obtain the relevant private key required by the printer 310 to decrypt the book. Therefore, for a book to be printed off, the book publisher 330 can be confident that the printer integrity has been checked by the printer manufacture and that the bookshop 300 has informed the book publisher 330 that the book has been printed, thereby allowing the book publisher 300 to charge the bookshop 300 for the printed book.

It will be appreciated that the foregoing book publisher example can equally be applied to any document, not just books.

Third Embodiment This embodiment (not illustrated) further expands the printing system to involve any number n of trusted authorities. The trusted authorities can be totally independent of each other and there is no need for any business relationship to exist between the trusted authorities, in fact the trusted authorities do not need to know each other.

In this embodiment each trusted authority $TA_i$ (i=1, ..., n) respectively selects a random $s_i \in C^{*}_q$ and set $R_i = s_i P$. The user encrypts a document $m \in \{0,1\}^k$ for sending to the printer 30 using n public keys $Q_{printi}$ (i=1, ..., n) each derived from a respective printing policy Printi (i=1, ..., n) $\in \{0,1\}^*$ that is associated with a respective one of the trusted authorities. The printer 30 can decrypt the encrypted document if the printer 30 receives the n private keys $S_{printi}$ (i=1, ..., n), each issued by a respective one of the trusted authorities in dependence on the associated printing policy, that is:

$$S_{printi} = s_i Q_{printi}.$$

More particularly, to encrypt a document, m, the user 50:
Computes a MapToPoint $(H_1(\text{Printi})) = Q_{printi}$ (i=1, ..., n) $\in E/F_p$ of order q.
Selects a random number $\sigma \in \{0,1\}^k$.
Computes $r = H_3(\sigma, m)$, where r is a random element that ensures only someone with the appropriate private key can decrypt the document, m.
Computes $U = rP$.
Computes $g_{print} = \Pi_{(1 \leq i \leq n)} p(Q_{printi}, R_i) \in F_{p^2}$.
Computes $V = \sigma \oplus H_2(g_{print})$.
Computes $W = m \oplus H_4(\sigma)$.
Sets the ciphertext to be $C = (U, V, W)$.
To decrypt the message, m, the printer 30:
Tests $U \in E/F_p$ of order q;
Computes $x = p(\Sigma_{(1 \leq i \leq n)} S_{printi}, U)$;
Computes $\sigma = V \oplus H_2(x)$;
Computes $m = W \oplus H_4(\sigma)$;
Computes $r = H_3(\sigma, m)$;
Checks $U = rP$.

It will be appreciated that many variants are possible to the above described embodiments of the invention. For example, the computing entity associated with at least one trusted authority can be incorporated into the same item of equipment as the printer itself, particularly where the role of this trusted authority is to check the integrity of the printer.

Although the above-described embodiments all concern the printing of data of interest by a printer, it will be appreciated that instead of the data of interest being effected by a printer as in the all the embodiments described above, an alternative out device can be used to record the data on a removable storage medium. For example, the data of interest can be output to a device for writing to a recordable CD-ROM disc or similar optically-readable storage medium.

Where multiple trusted authorities are involved, it is possible to use a single printing policy giving rise to a single public key $Q_{print}$ in which case computation of $g_{print}$ in the above-described third embodiment simplifies to:

$$g_{print} = p(\Sigma_{1 \leq i \leq n} R_i, Q_{print})$$

Such a single printing policy is likely to be divided into a respective sub-policy (comprising one or more conditions) associated with each trusted authority, each such authority being satisfied that the policy is satisfied if its associated sub-policy is met.

Other ways of providing for the involvement of multiple trusted authorities are also possible. For example, the user can organise the document-to-be-printed as a number of data strings (say n strings) by using Shamir's secret sharing scheme, and then encrypt each string using the public data of a respective one of the trusted authorities and a corresponding printing policy. In order to recover the document in cleartext, the printer has to decrypt all of the strings by obtaining the appropriate decryption keys from the trusted authorities; it necessary to recover all strings because any n'1 strings or less cannot, according to Shamir's secret sharing scheme, disclose any information of the document. The Shamir secret sharing scheme also allows an implementation in which the participation of any t out of n share holders is sufficient to enable recovery of the secret.

In an alternative arrangement of multiple trusted authorities each associated with a respective printing policy, the user uses the data encrypted in respect of one printing policy as the data to be encrypted in respect of the next printing policy, the encrypted data resulting from the encryption effected in respect of all printing policies then being sent to the printer for decryption in successive decryption operations using decryption keys obtained from the trusted authorities.

The invention claimed is:
1. A system comprising:
an output device for outputting data onto a removable storage medium;

a first computing entity for encrypting a first data set, the first computing entity encrypting the first data set based on encryption parameters that comprise:
public data of a trusted party, and
an encryption key string comprising a second data set that defines a policy for allowing the output of the first data set onto a said removable storage medium,
the first computing entity being further arranged to output the encrypted first data set for the output device; and
a second computing entity associated with the trusted party and arranged when satisfied that said policy has been met, to output for the output device a decryption key, distinct from the encryption key string, for use in decrypting the encrypted first data set, the second computing entity being arranged to generate this decryption key in dependence on the encryption key string and private data related to said public data; the output device being arranged to use the decryption key in decrypting the encrypted first data set.

2. A system according to claim 1, wherein the second computing entity is arranged to generate the decryption key only when said policy has been met.

3. A system according to claim 1, wherein the second computing entity is arranged to issue to the first computing entity at least one of:
the second data set;
the encryption key string;
a derivative of the encryption key string usable by the first computing entity, in place of the encryption key string, in the encryption of said first data set.

4. A system according to claim 1, wherein the second computing entity is arranged to receive the encryption key string directly or indirectly from the first computing entity.

5. A system according to claim 1, further comprising at least one further second computing entity associated with a respective further trusted party that has related public and private data, said encryption parameters further comprising for the or each said further trusted party the public data of that trusted party and a respective further encryption key string that comprises further second data defining a further policy for allowing printing of the first data set; the or each further second computing entity being arranged, when satisfied that the policy defined by the encryption key string related to the associated trusted party has been met, to provide a further decryption key to the output device, the second computing entity concerned being arranged to generate this further decryption key in dependence on the private data and encryption key string corresponding to the associated trusted party; and decryption of the encrypted first data set by the output device requiring use of the decryption keys provided by all of the trusted parties.

6. A system according to claim 5, wherein the first data set concerns a document to be published, the first computing entity and one of the second computing entities are both associated with a document publisher, and the output device is associated with a document seller; the second computing entity associated with the document publisher being arranged to check satisfaction at least of a policy condition requiring notification of details of the document and seller to the document publisher, and a further said second computing entity being arranged to check satisfaction of at least one policy condition concerning the output device.

7. A system according to claim 5, wherein the first computing entity is arranged to process the first data set, prior to encryption, to form a plurality of data strings, the first computing entity being further arranged to encrypt each data string based on the encryption parameters associated with a respective one of the trusted parties, and the output device being arranged to decrypt each string using the decryption key provided by the related trusted party and then to process the strings to recover the first data set.

8. A system according to claim 1, further comprising at least one further second computing entity associated with a respective further trusted party that has related public and private data, said encryption parameters further comprising the public data of the or each further trusted party; each second computing entity being arranged, when satisfied that the policy defined by the encryption key string has been met so far as the associated trusted party is concerned, to provide a respective decryption key to the output device, the second computing entity concerned being arranged to generate this decryption key in dependence on the encryption key string and the private data of the associated trusted party;
and decryption of the encrypted first data set by the output device requiring use of the decryption keys provided by all of the trusted parties.

9. A system according to claim 8, wherein said policy comprises a respective set of at least one condition associated with the or each trusted party, each second computing entity being arranged to be satisfied that said policy has been met when the set of at least one condition for the trusted party associated with the second computing entity concerned has been met.

10. A system according to claim 8, wherein the first data set concerns a document to be published, the first computing entity and one of the second computing entities are both associated with a document publisher, and the output device is associated with a document seller; the second computing entity associated with the document publisher being arranged to check satisfaction at least of a policy condition requiring notification of details of the document and seller to the document publisher, and a further said second computing entity being arranged to check satisfaction of at least one policy condition concerning the output device.

11. A system according to claim 1, wherein the first data set is encrypted using a bilinear pairing technique.

12. A system according to claim 1, wherein the first data set is encrypted using a quadratic residue technique.

13. A system according to claim 1, wherein the output device and the second computing entity are incorporated into the same item of equipment.

14. A system according to claim 1, further comprising a portable device comprising the second computing entity and a first communications interface, the output device comprising a second communications interface arranged to cooperate with the first communications interface to enable communication between the second computing entity and the output device; the communications interfaces being such that the portable device must be present at the output device for the communication between the second computing entity to take place.

15. A data output method comprising the steps of:
(a) encrypting a first data set, said encrypting being based on encryption parameters that comprise:
i. public data of a trusted party, and
ii. an encryption key string comprising a second data set that defines a policy for allowing the output of the first data set to a removable storage medium,
(b) providing the encrypted first data set to an output device adapted to output data to a removable storage medium;
(c) at the trusted party checking that said policy has been satisfied and thereafter providing the output device with a decryption key, distinct from the encryption key string, for use in decrypting the encrypted first data set, this decryption key being generated in dependence on the encryption key string and private data related to said public data; and (d) at the output device using the decryption key in decrypting the encrypted first data set and outputting the first data set to a removable recording medium.

16. A method according to claim 15, wherein in step (c) the decryption key is generated only after said policy has been satisfied.

17. A method according to claim 15, further comprising an initial step of generating the second data set at the trusted party and providing to a party that is to carry out step (a) at least one of:

the second data set;
the encryption key string;
a derivative of the encryption key string usable in step (a), in place of the encryption key string, in the encryption of said first data set.

18. A method according to claim 15, wherein the trusted party receives the encryption key string directly or indirectly from a party that carries out step (a).

19. A method according to claim 15, wherein:

in step (a) said encryption parameters further comprise public data of at least one further trusted party and a respective related further encryption key string that comprises further second data defining a further policy for allowing printing of the first data set;

in step (c) the or each further trusted party, when satisfied that the policy defined by the related encryption key string has been met, provides a further decryption key to the output device, the further trusted party concerned generating this further decryption key in dependence on private data and said related encryption key string; and in step (d) decryption of the encrypted first data set by the output device requires use of the decryption keys provided by all of the trusted parties.

20. A method according to claim 19, wherein:

the first data set concerns a document to be published;
step (a) is carried out by a document publisher who also serves as one of the trusted parties;
the output device is associated with a document seller;
in step (c) the trusted party associated with the document publisher checks satisfaction at least of a policy condition requiring notification of details of the document and seller to the document publisher, and
in step (c) another of said trusted parties checks satisfaction of at least one condition concerning the output device.

21. A method according to claim 19, wherein:

in step (a) the first data set is processed, prior to encryption, to form a plurality of data strings, each string being thereafter encrypted based on the encryption parameters associated with a respective one of the trusted parties, and
in step (d) the output device decrypts each string using the decryption key provided by the related trusted party and then processes the strings to recover the first data set.

22. A method according to claim 15, wherein:

in step (a) said encryption parameters further comprise public data of at least one further trusted party;
in step (c) each trusted party, when satisfied that the policy defined by the encryption key string has been met so far as it is concerned, provides a respective decryption key to the output device, the further trusted party concerned generating this decryption key in dependence on private data and the encryption key string; and in step (d) decryption of the encrypted first data set by the output device requires use of the decryption keys provided by all of the trusted parties.

23. A method according to claim 22, wherein said policy comprises a respective set of at least one condition associated with the or each trusted party, each trusted party being arranged to be satisfied that said policy has been met when the set of at least one condition associated with the trusted party has been met.

24. A method according to claim 22, wherein:

the first data set concerns a document to be published;
step (a) is carried out by a document publisher who also serves as one of the trusted parties;
the output device is associated with a document seller;
in step (c) the trusted party associated with the document publisher checks satisfaction at least of a policy condition requiring notification of details of the document and seller to the document publisher, and
in step (c) another of said trusted parties checks satisfaction of at least one condition concerning the output device.

25. A method according to claim 15, wherein in step (a) the first data set is encrypted using a bilinear pairing technique.

26. A method according to claim 15, wherein in step (a) the first data set is encrypted using a quadratic residue technique.

27. A method according to claim 15 wherein the trusted authority is implemented in a portable device arranged to communicate with the output device only when the portable device is present at the output device.

28. A printing system comprising:

a printer;
a first computing entity for encrypting a first data set, the first computing entity encrypting the first data set based on encryption parameters that comprise:
  i. public data of a trusted party, and
  ii. an encryption key string comprising a second data set that defines a policy for allowing the printing of the first data set,
the first computing entity being further arranged to output the encrypted first data set for the printer; and
a second computing entity associated with the trusted party and arranged when satisfied that said policy has been met, to output for the printer a decryption key, distinct from the encryption key string, for use in decrypting the encrypted first data set, the second computing entity being arranged to generate this decryption key in dependence on the encryption key string and private data related to said public data;
the printer being arranged to use the decryption key in decrypting the encrypted first data set.

29. A system according to claim 28, further comprising at least one further second computing entity associated with a respective further trusted party that has related public and private data, said encryption parameters further comprising for the or each said further trusted party the public data of that trusted party and a respective further encryption key string that comprises further second data defining a further policy for allowing printing of the first data set; the or each further second computing entity being arranged, when satisfied that the policy defined by the encryption key string related to the associated trusted party has been met, to provide a further decryption key to the printer, the second computing entity concerned being arranged to generate this further decryption key in dependence on the private data and encryption key string corresponding to the associated trusted party; and decryption of the encrypted first data set by the printer requiring use of the decryption keys provided by all of the trusted parties.

30. A system according to claim 29, wherein the first data set concerns a document to be published, the first computing entity and one of the second computing entities are both associated with a document publisher, and the printer is associated with a document seller; the second computing entity associated with the document publisher being arranged to check satisfaction at least of a policy condition requiring notification of details of the document and seller to the document publisher, and a further said second computing entity being arranged to check satisfaction of at least one policy condition concerning the printer.

31. A system according to claim 29, wherein the first computing entity is arranged to process the first data set, prior to encryption, to form a plurality of data strings, the first computing entity being further arranged to encrypt each data string based on the encryption parameters associated with a respective one of the trusted parties, and the printer being arranged to decrypt each string using the decryption key provided by the related trusted party and then to process the strings to recover the first data set.

32. A system according to claim 28, further comprising at least one further second computing entity associated with a respective further trusted party that has related public and private data, said encryption parameters further comprising the public data of the or each further trusted party; each second computing entity being arranged, when satisfied that the policy defined by the encryption key string has been met so far as the associated trusted party is concerned, to provide a respective decryption key to the printer, the second computing entity concerned being arranged to generate this decryption key in dependence on the encryption key string and the private data of the associated trusted party; and decryption of the encrypted first data set by the printer requiring use of the decryption keys provided by all of the trusted parties.

33. A system according to claim 32, wherein said policy comprises a respective set of at least one condition associated with the or each trusted party, each second computing entity being arranged to be satisfied that said policy has been met when the set of at least one condition for the trusted party associated with the second computing entity concerned has been met.

34. A system according to claim 32, wherein the first data set concerns a document to be published, the first computing entity and one of the second computing entities are both associated with a document publisher, and the printer is associated with a document seller; the second computing entity associated with the document publisher being arranged to check satisfaction at least of a policy condition requiring notification of details of the document and seller to the document publisher, and a further said second computing entity being arranged to check satisfaction of at least one policy condition concerning the printer.

35. A system according to claim 28, wherein the first data set is encrypted using a bilinear pairing technique.

36. A system according to claim 28, wherein the first data set is encrypted using a quadratic residue technique.

37. A system according to claim 28, wherein the printer and the second computing entity are incorporated into the same item of equipment.

38. A system according to claim 28, further comprising a portable device comprising the second computing entity and a first communications interface, the printer comprising a second communications interface arranged to cooperate with the first communications interface to enable communication between the second computing entity and the printer; the communications interfaces being such that the portable device must be present at the printer for the communication between the second computing entity to take place.

* * * * *